Feb. 16, 1954 — M. H. TONCRAY ET AL — 2,669,462
MOTOR VEHICLE FRAME STRUCTURE
Filed April 7, 1948 — 5 Sheets-Sheet 1
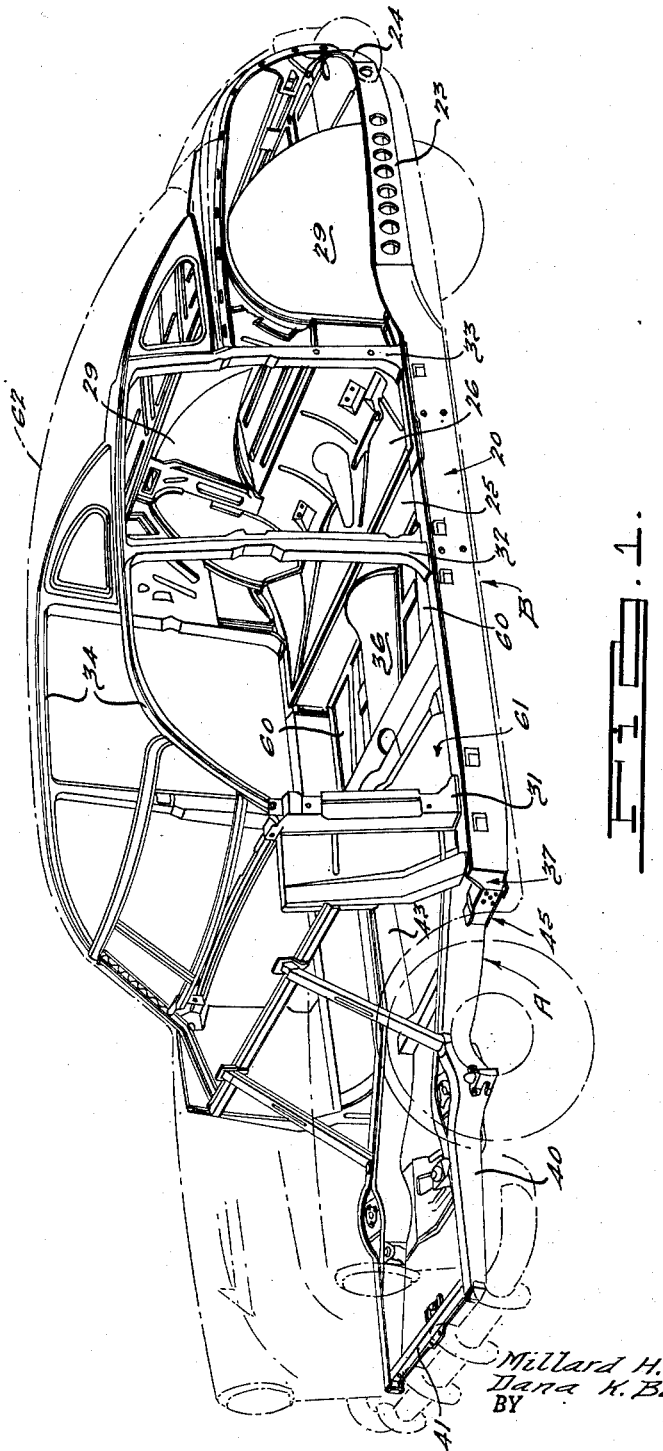
INVENTORS,
Millard H. Toncray,
Dana K. Badertscher,
BY
Elmer Jamison Gray
ATTORNEY.

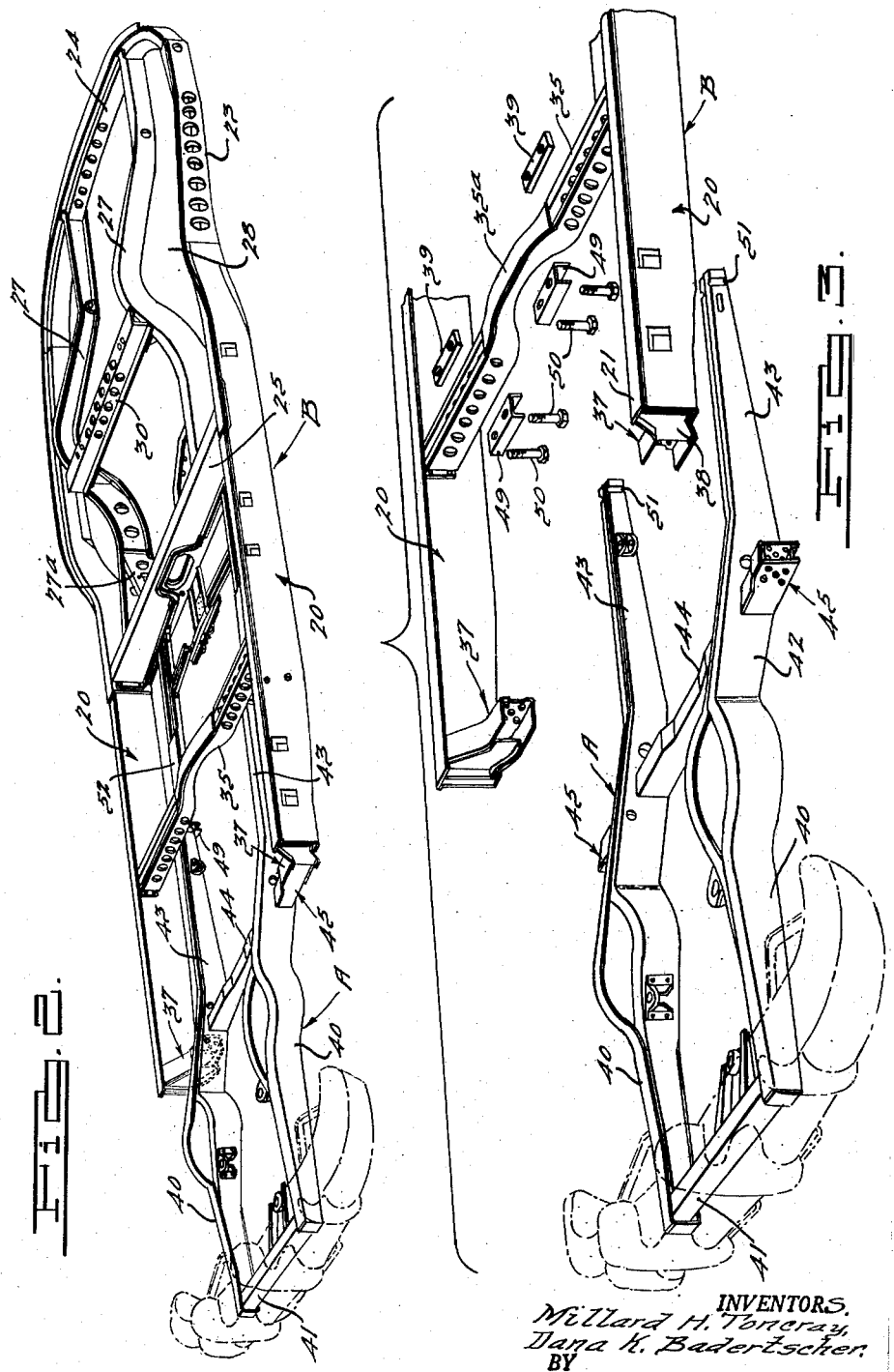

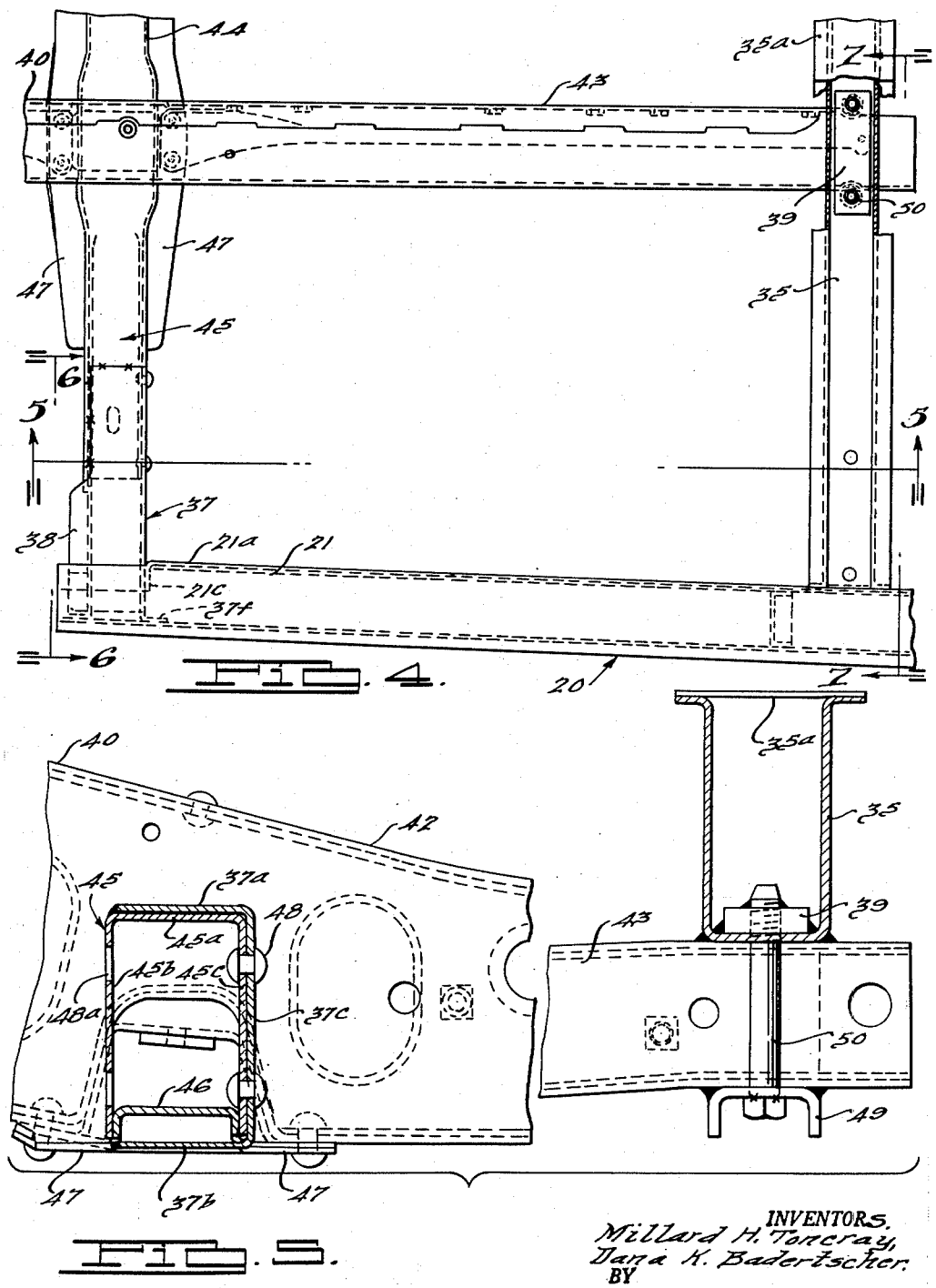

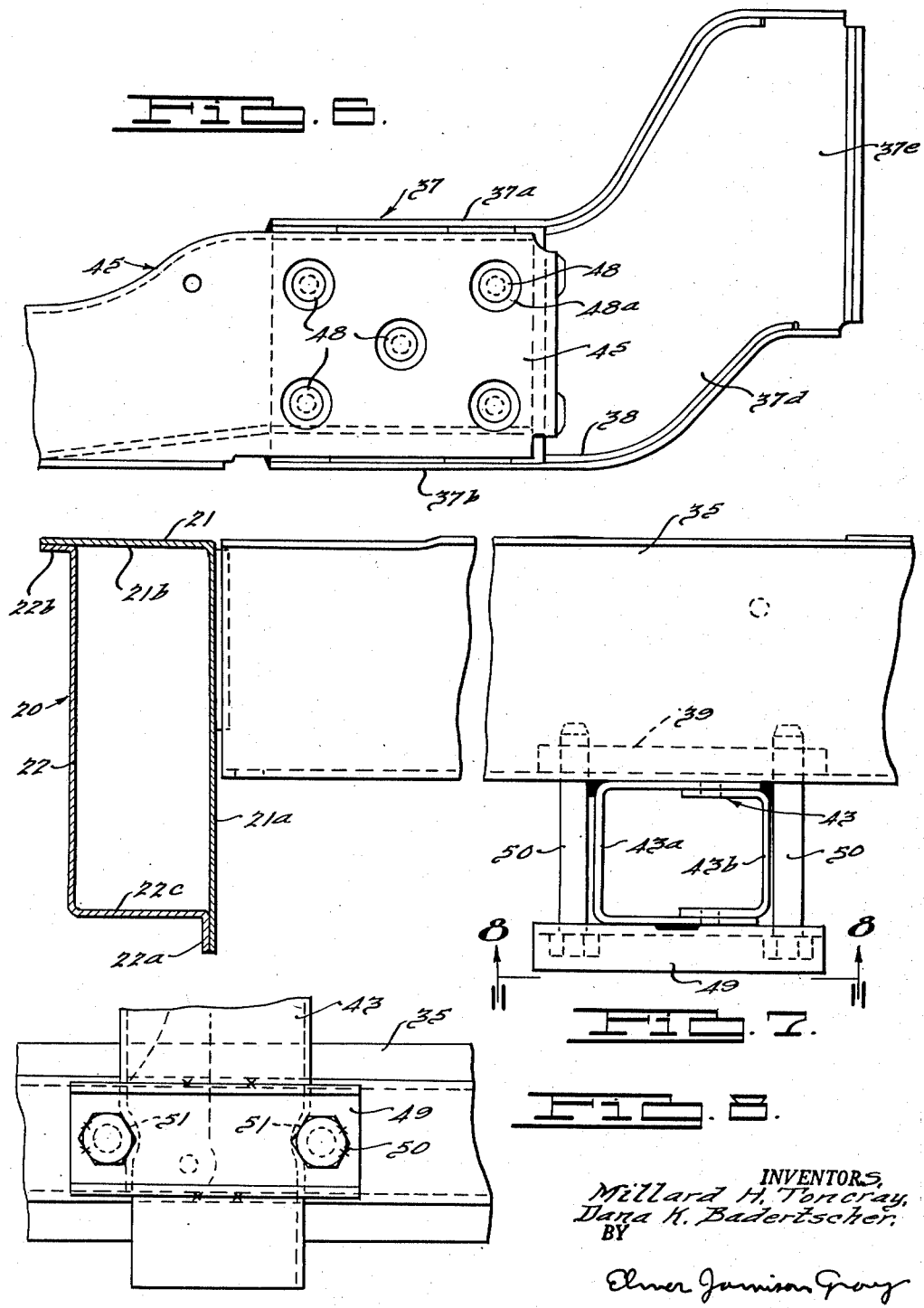

INVENTORS
Millard H. Toncray,
Dana K. Badertscher,
BY
Elmer Jamison Gray
ATTORNEY.

Patented Feb. 16, 1954

2,669,462

UNITED STATES PATENT OFFICE 2,669,462

MOTOR VEHICLE FRAME STRUCTURE

Millard H. Toncray and Dana K. Badertscher, Grosse Pointe Park, Mich., assignors to Hudson Motor Car Company, Detroit, Mich., a corporation of Michigan Application April 7, 1948, Serial No. 19,616

10 Claims. (Cl. 280—106)

This invention relates to motor vehicles and more particularly to improvements in the construction of the body and frame of automobiles.

Heretofore it has been the practice in the production of automobiles to provide a main chassis frame extending from front to rear of the vehicle, this frame usually comprising unitary longitudinal side frame members connected together by cross members. Upon this frame the body, running gear, wheels, power plant and other mechanisms are installed during travel of the chassis frame along the main assembly line. The body has customarily been fabricated as a complete unit separately from the chassis frame and has then been transported to the main assembly line where it has been installed on the chassis frame. This system of building and assembling together the main component parts of an automobile has certain disadvantages. For example, it requires the fabrication of the body with a separate body frame which is later attached to a separate chassis frame. It requires the assembly of substantially all main component parts of the automobile, such as the wheels, power plant, running gear and body, on a full length chassis frame at the main assembly line locations, hence requiring considerable plant space in order to accommodate the travel of successive full length chassis frames throughout all main assembly operations. Since these methods have required the building of the body separate from the main chassis frame, usually at a plant distant from the plant where the main assembly operations are performed, considerable additional framing has necessarily been incorporated in the body in order to produce a unitary structure for later assembly with the chassis frame. These methods, heretofore resorted to, have enhanced materially the costs of production not only in respect to material costs but also labor costs.

An important object of the present invention is to overcome many of the disadvantages of former practice in automobile production by not only reducing the cost of production but also simplifying assembly operations.

A further object of the invention is to provide an improved body and frame assembly for an automobile which will have the utmost strength to withstand strains, stresses and shocks without sacrificing lightness, which will afford the maximum roominess within the tonneau for passengers, and which will possess a high safety factor by virtue of the fact that the body and hence the center of gravity of the vehicle may be lowered while retaining the requisite head room for the passengers.

Another object of the invention is to provide a divided or sectional frame construction whereby the body may be built as a unitary part of one frame section to form one complete sub-assembly, and the power plant as well as all associated front end parts and mechanisms may be assembled on another frame section to form a second complete sub-assembly, after which the two subassemblies are brought together and united to produce the complete assembled automobile.

Still another object of the invention is to provide an improved body and frame for an automobile wherein the frame is divided into two front and rear sections with the rear section forming a unitary part of the body, the two sections being telescoped together or otherwise united at final assembly in such manner as to produce a composite full length frame possessing all of the requisites of strength and rigidity.

A further object of the invention is to provide a frame composed of front and rear sections, each comprising spaced longitudinal side frame members, and wherein means is provided for uniting together the front and rear sections in such manner as to produce a frame structure having at least as great strength as conventional frames wherein each side frame member is a full length single structural member.

Still a further object of the invention is to form the frame of the automobile in two front and rear sections, each composed of spaced longitudinal side frame members joined by cross members, and to unite these frame sections during assembly of the car at longituditionally spaced pairs of points or locations so as to impart great strength and rigidity to the structure. This is accomplished preferably by uniting the ends of the longitudinal frame members of each section with a cross frame member of the other section. More specifically an object of the invention is to unite the front ends of the rear section side frame members by means of a cross frame member which in turn is rigidly attached at its ends to the side frame members of the front section at points forwardly of the rear ends thereof, and to unite the rear ends of the front section side frame members by means of a cross frame member which in turn is rigidly attached at its ends to the rear section side frame members at points rearwardly of the forward ends of the latter.

A further object of the invention is to provide a body frame structure comprising an outer main frame of general U-shape extending completely around the body with the side members thereof spaced substantially the full width of the body to underlie the doors and to extend outside the wheels, said frame structure also comprising inner longitudinal frame members joined to the cross frame members and extending parallel to the outer frame side members substantially the full length of the body. By virtue of the improved frame construction the body is in effect supported by a double longitudinal frame which adds great strength to the car as well as affording the maximum protection in the event of collision.

Another object of the invention is to mount the rear wheels between pairs of longitudinal frame members spanned by wheel housings which completely enclose the upper parts of the rear wheels.

A further object of the invention is to arrange the outer main side frame members substantially along the outer margins of the doors and immediately beneath the lower edges thereof and to depress or lower the portions of the floor or floor pan lying adjacent and inwardly of these frame members a distance at least equal to the major depth of these frame members. As a result of this improved construction the passenger may enter the car with less effort since he steps down into the passenger compartment instead of stepping up onto a floor, as heretofore, which extends above the longitudinal side frame members. This improved construction further has the advantage of lowering the body and the center of gravity thereof without sacrificing the desired head room for the passengers.

Other objects of this invention will appear in the following description and appended claims, reference being had to the accompanying drawings forming a part of this specification wherein like reference characters designate corresponding parts in the several views.

Fig. 1 is a perspective view illustrating the component assembled frame members of an automobile constructed in accordance with one embodiment of the present invention.

Fig. 2 is a perspective view of the assembled frame members with the body removed.

Fig. 3 is an enlarged fragmentary perspective view illustrating various parts of the frame before assembly thereof.

Fig. 4 is an enlarged fragmentary plan view, partly in section, illustrating a portion of the frame at the locality where the front and rear sections of the frame are joined together.

Fig. 5 is an enlarged broken section taken substantially through lines 5—5 of Fig. 4 looking in the direction of the arrows.

Fig. 6 is an enlarged fragmentary front elevation taken substantially from lines 6—6 of Fig. 4 looking in the direction of the arrows.

Fig. 7 is a view in elevation and partly in section taken substantially through lines 7—7 of Fig. 4 looking in the direction of the arrows.

Fig. 8 is a fragmentary bottom plan view taken from lines 8—8 of Fig. 7 looking in the direction of the arrows.

Figure 9:
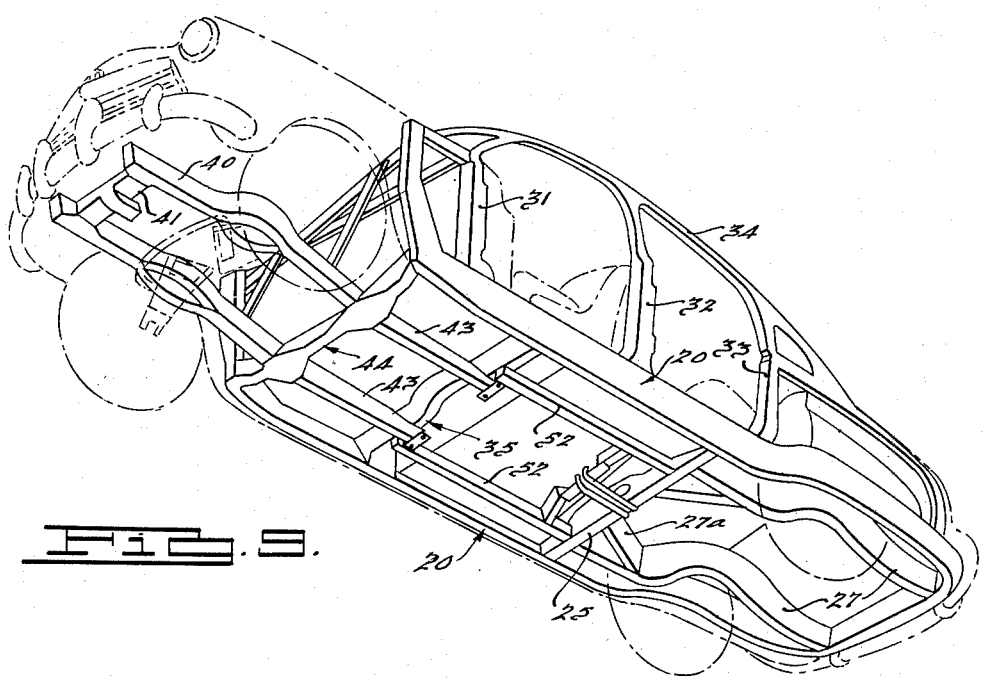
Fig. 9 is a perspective view illustrating diagrammatically the underside of the frame structure for the vehicle.
Figure 10:
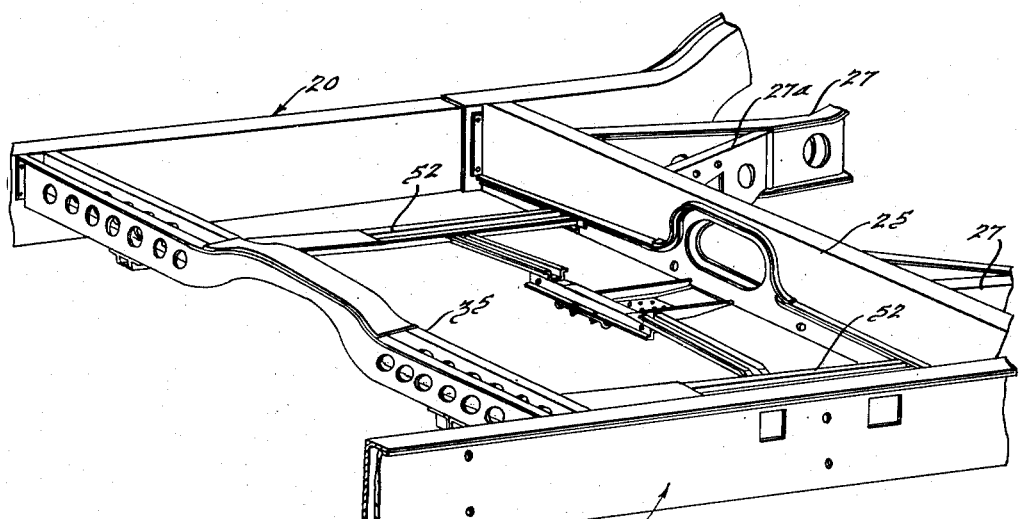
Fig. 10 is an enlarged fragmentary perspective view of a portion of the frame structure shown in Fig. 2.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings there is illustrated, by way of example, one embodiment of the present invention in which the frame structure of the automotive vehicle is divided into two front and rear sections which, as parts of two sub-assemblies, are joined together during the final assembly of the vehicle. The front frame section forming part of the power plant sub-assembly is indicated generally at A, and the rear frame section forming part of the body sub-assembly is indicated generally at B.

The frame section B includes two main longitudinally extending and laterally spaced generally parallel side frame members 20. As particularly shown in Fig. 7, each side frame member 20 comprises inner and outer angle members 21 and 22, respectively. The vertical web 21a of angle 21 overlaps and is welded to a depending flange 22a on angle 22, and the top web 21b of angle 21 overlaps an outwardly turned flange 22b of angle 22 and is welded thereto. By virtue of this construction each main side frame member 20 is in the form of a closed box section. In the present instance the frame members 20 are attached at their rear ends, as by butt welding, to a pair of similar side frame members 23 which in turn are rigidly attached at their rear ends, as by butt welding, to a rear generally U-shaped frame member 24. It will be seen that the main frame members 20, 23 and 24 produce a generally U-shaped unitary main frame extending continuously around the body along the sides and around the rear end thereof.

The frame members 20 are connected together by a cross frame member 25 which is box-like in cross section and is secured at its ends by riveting or welding or both to the members 20. This cross member 25 extends along the front edge of a raised rear compartment floor panel 26 (Fig. 1) which is rigidly secured along its front edge to the top of the frame member 25, as by welding. Mounted inside the main outer frame 20, 23 and 24 and spaced inwardly of the sides thereof are a pair of supplemental longitudinal channel frame members 27 which extend from the cross member 25 to the rear cross member 24 and are rigidly secured at their ends to these cross members, as by welding. The front ends of the frame members 27 are braced to the cross member 25 by means of angle braces 27a. Since each frame member 27 lies inwardly of the adjacent outer side frame member 20, 23, there is provided therebetween a space 28 through which a rear wheel extends. This space is closed at each side of the frame by means of a wheel housing unit 29 comprising a pair of dished pressed metal half sections welded together along a curve defining the juncture of the sections to form a complete enclosure for the upper part of the rear wheel. The spaced lower edges of each wheel housing 29 are flanged and secured as by welding to the upper edges of the frame members 27, 20 and 23. The inside longitudinal frame members 27 are secured together and braced by means of a transverse angle member 30 welded at its ends to these frame members.

As illustrated in Fig. 1, the superstructure of the body, which is constructed by way of example to provide a four-door sedan, comprises front pillars 31, center pillars 32 and rear pillars 33. The frame members 20 are spaced apart substantially the full width of the body so that the lower ends of the pillars 31, 32 and 33 bear directly upon the frame members 20 and are rigidly secured thereto as by welding. The upper ends of these pillars are joined together by means of longitudinally extending header members 34. Where the body is designed, as in the present instance, for the purposes of a four-door sedan, each front door is installed between the pillars 31 and 32 and each rear door is installed between the pillars 32 and 33, the doors being hinged to certain of these pillars in the usual manner. Thus, it will be seen that by spacing the side frame members 20 substantially the full width of the body so as to directly underlie the lower ends of the pillars these frame members also will lie directly beneath the lower edges of the doors.

The main side frame members 20 are joined in advance of the cross frame member 25 by an upwardly opening channel-shaped cross member 35 which is upwardly bowed at its center to provide clearance for the propeller shaft tunnel 36. The upper edges of the channel member 35 are flanged outwardly and the central portion of this member is boxed in by a top plate 35a welded to the flanges, see Fig. 5. The cross frame member 35 lies between the floors or floor pan portions of the front and rear passenger compartments at substantially the locality of the back of the front seat. The floor pan 60 for the rear passenger compartment, extending between the cross frame members 25 and 35 and at opposite sides of the tunnel 36, is depressed well below the tops of the side frame members 20 as well as the top of the cross frame member 25. Preferably the floor pan 60 is depressed nearly to the depth of these frame members 20 and 25 as well as the cross frame member 35. In like manner the floor or floor pan 61 for the front passenger compartment in advance of the cross frame member 35 is depressed substantially or nearly to the depth of the frame members 20. The lowering of the floor pans 60 and 61 a distance equivalent to at least the major depth of the side frame members 20 is rendered possible by spacing these side frame members substantially the full width of the body so that the floor of the body will lie entirely between these side frame members, thus permitting advantage to be taken of the depth of the side frame members in lowering the floor and, as a consequence, lowering the roof panel 62 an equivalent amount and thereby lowering materially the center of gravity of the body.

It will be noted that the side frame members 20 terminate a short distance in advance of the front pillars 31. Attached to the front ends of the side frame members 20 are stub frame extensions 37 which extend inwardly preferably at right angles to the frame members 20 and form not only abutments for locating the front frame unit A when assembled with the frame unit B but also connectors therefor. Referring particularly to Figs. 4 to 6 inclusive, the inner vertical side wall 21a of each frame member 20 is cut away at its front end and flanged inwardly at 21c to provide an end opening at the inner side of the frame member 20 for the reception of the outer end of the stub frame extension 37, see Fig. 4. Each extension 37, see Fig. 5, is in the form of a forwardly opening channel comprising top and bottom horizontal flanges 37a and 37b and a rear vertical connecting web 37c. The inner portion of each extension 37, as shown in Fig. 6, is straight and horizontal and outwardly of this portion the extension or member 37 flares upwardly and outwardly at 37d to provide a widened end 37e corresponding in depth substantially to the depth of the side frame member 20 between the top and bottom flanges 21b and 22c thereof. The ends of the widened portion 37e are formed with outwardly turned flanges 37f which abut against the outer wall of the frame member 20 and are welded thereto. The top and bottom edges of the portion 37e of each extension 37 are also welded to the flanges 21b and 22c and to the flange 21c. Each extension 37 is thus rigidly and substantially integrally attached to the front terminal end of one of the front side frame members 20. As illustrated in Fig. 6, a reinforcing channel piece 38 is welded into the channel formed by the member 37. Referring to Fig. 5, and to the cross channel member 35, a pair of plates 39 are mounted within and welded to the bottom of the channel at opposite ends thereof, each plate being provided with a pair of tapped holes.

The front sub-assembly unit comprises spaced longitudinal extending side frame members 40 which may be box-like in construction generally similar to the side frame members 20. These front side frame members 40 are joined together at their front ends by a front cross member 41 which is preferably box-like in cross section. The frame members 40 of the front sub-assembly unit A provide mountings for the power plant, front wheels, shock absorbers, springs, steering mechanism and associated parts. The side frame members 40 are preferably tapered down at 42 to reduce the depth thereof and thence are formed with parallel rearward extensions 43 which are preferably box-like in cross section, as shown in Fig. 7. Each of these extensions 43 is fabricated from outer and inner channels 43a and 43b which are interfitted and rigidly secured together by riveting or welding or both. The distance between the frame extensions 43 is substantially less than the distance between the main frame members 20 so as to enable the side frame members of the front and rear sections A and B to be telescoped together during the final assembly operation.

At the locality of the tapering portions 42 of the frame members 40 these members are connected together by means of a cross frame member 44 which is in the form of an inverted U-shaped channel. This channel extends through slots in the portions 42 of the frame member 40 and is rigidly secured thereto by welding. The cross frame member 44 projects laterally beyond the outer sides of the frame members to provide connector extensions 45. As shown in Fig. 5, each extension 45 comprises an inverted U-shaped channel having a top web 45a and depending side flanges 45b and 45c. The lower edges of these side flanges are joined together by an inserted U-shaped reinforcing bar 46 which is welded in place to the side flanges so as to produce with the channel extension 45 a closed box section. As illustrated particularly in Figs. 4 and 5, the sides of the channel bar 46 may be formed with lateral flanges 47 underlying the frame members 40 and secured thereto as by riveting.

During the final assembly operation when the frame sections A and B of the front and rear sub-assemblies are assembled together, the front section A is telescoped with the rear section by shifting the leg extension 43 into position between the side frame members 20 so as to couple the extensions 45 with the connector members 37. Since the latter are in the form of forwardly opening channels they provide sockets within which the connector members 45 fit when the sections A and B are brought together, this coupling of the members 45 and 37 being illustrated particularly in Figs. 5 and 6. The channel shaped members 37 are constructed so that the connector extensions 45 will have a fairly snug sliding fit between the flanges 37a and 37b with the flange 45c abutting against the flange 37c, see Fig. 5. These flanges are riveted together at 48, the rivets being insertable into place through holes 48a. After the members 45 and 37 have thus been assembled the members are welded together along all exposed edges and also at the rivet heads in order to provide substantially an integral joint between the parts.

When the frame sections A and B are brought into proper assembled relation the rear ends of the leg extensions 43 underlie the cross frame member 35 in the manner shown in Figs. 5 and 7. A channel shaped reinforcing plate 49 is installed beneath each leg extension 43 and bolts 50 are shifted upwardly through holes in the plate 49 at opposite sides of the leg extensions 43 and are screwed into tapped holes in the plate 39. After the bolts 50 have been drawn up tightly so as to clamp the leg extensions 43 to the bottom of the cross frame member 35 the ends of the bolts are welded to the plates 39 and 49 and the leg extensions 43 are welded to the members 35 and 49 in the manner shown in Fig. 5 so as to provide a permanent inseparable structure. As illustrated in Fig. 8, the ends of the leg extensions 43 may be provided with vertical grooves 51 to receive the shanks of the bolts 50 so as to assist in interlocking the parts together.

From the foregoing it will be seen that the front ends of the side frame members 20 are provided with inwardly extending connector members 37 which form sockets to receive the extensions 45 of the cross frame member 44. In this manner the front ends of the side frame members 20 are rigidly connected to the cross frame member 44. Furthermore, the leg extensions 43 of the side frame members 40 are rigidly connected at their inner ends to the cross frame member 35. It will thus be noted that the frame extensions 43 provide with the frame members 20 a double longitudinal frame beneath the body between the cross members 44 and 35. This double frame construction is continued between the cross frame members 35 and 25 by means of a pair of longitudinal channel shaped frame members 52 having their ends underlying the bottoms of the cross members 35 and 25 and rigidly secured thereto as by welding. The body thus has a double frame construction from front to rear by virtue of the outer frame members 20 and the inside frame members 43, 52 and 27, and since all of the parts entering into the frame construction are welded together a very strong supporting frame is produced which will withstand shocks, strains and stresses during operation of the vehicle.

We claim:

1. In a motor vehicle, a unitary main chassis frame formed from two separate front and rear sections attached together, the front section comprising longitudinal frame members and a cross member connecting the same together forwardly of the rear ends thereof, the rear section comprising longitudinal frame members and a cross member connecting the same together rearwardly of the front ends thereof, means for attaching said front ends of the rear section frame members to said first named cross member, and means for attaching the rear ends of the front section frame members to the underside of the rear section cross member, the top surfaces of the front section longitudinal frame members declining substantially from the front section cross frame member to below the rear section cross frame member so as to extend below the top surfaces of the rear section longitudinal frame members throughout the major portions thereof between said cross frame members.

2. In a motor vehicle, a unitary main chassis frame formed from two separate front and rear sections attached together, the front section comprising longitudinal frame members and a cross member connecting the same together forwardly of the rear ends thereof, the rear section comprising longitudinal frame members and a cross member connecting the same together rearwardly of the front ends thereof, the longitudinal frame members of one section lying between and at a lower level than the longitudinal frame members of the other section, means for attaching said front ends of the rear section frame members to said first named cross member, and means for attaching the rear ends of the front section frame members to the underside of the rear section cross member, one of said means comprising box-like extensions on the cross member fitting into transverse channel extensions on the frame members, said channel extensions opening longitudinally to receive the box-like extensions therein upon relative longitudinal movement of said front and rear sections.

3. In a motor vehicle, a front main frame section and a rear main frame section, each section including spaced longitudinal side members, the members of one section being spaced apart a less distance than the members of the other section and extended therebetween at a lower level, and a cross frame member connecting the ends of the side members of each section to the members of the other section, the top surfaces of the inner side members being inclined forward from below the rearmost cross frame member substantially to the foremost cross frame member.

4. In a motor vehicle, a pair of longitudinal side frame members, a body mounted on said members, a front frame unit including side frame members extending between and spaced from said first named side frame members, and a pair of longitudinally spaced cross frame members rigidly joining said side frame members together, the side frame members of the front frame unit being declined rearward to extend throughout the major portion thereof between said cross frame members below the rearmost cross frame member, with the top surfaces of said last named side frame members throughout the major portion thereof between said cross frame members extending appreciably below the top surfaces of the other side frame members.

5. In a motor vehicle, a main frame comprising a front section and a rear section, each section comprising spaced longitudinally extending side frame members with the members of the front section disposed between and in spaced overlapping relation to the members of the rear section, the rear ends of the side frame members of the front section extending rearwardly past the forward ends of the side frame members of the rear section, the side frame members of the front section having attaching extensions projecting outwardly from the members at points forwardly of the rear ends thereof and the side frame members of the rear section having attaching extensions projecting inwardly from the members, said extensions of the front and rear sections being disposed in the spaces between the side frame members of the two sections and rigidly secured together, each of the extensions of the side frame members of one section comprising a longitudinally opening channel member having a transversely extending vertical wall terminating along the upper and lower edges thereof in spaced horizontal flanges directed longitudinally from said edges, the extensions of the other section having portions abutting said vertical walls and received between said flanges in interfitting relation upon relatively shifting said sections together in a longitudinal direction.

6. In a motor vehicle, a main frame comprising a front section and a rear section, each section comprising spaced longitudinally extending side frame members with the members of the front section disposed between and in spaced relation to the members of the rear section, the rear ends of the side frame members of the front section extending rearwardly past the forward ends of the side frame members of the rear section, the side frame members of the front section having attaching extensions projecting outwardly from the members at points forwardly of the rear ends thereof and the side frame members of the rear section having attaching extensions projecting inwardly from the members, said extensions of the front and rear sections being disposed in the spaces between the side frame members of the two sections and rigidly secured together, each of the extensions of the side frame members of the rear section comprising a longitudinally opening channel member having a transversely extending vertical wall terminating along the upper and lower edges thereof in spaced horizontal flanges directed longitudinally from said edges, the extensions of the front section having portions abutting said vertical walls and received between said flanges in interfitting relation upon relatively shifting said sections together in a longitudinal direction.

7. In a motor vehicle, a front main frame section and a rear main frame section, each section including spaced longitudinal side members, the members of the front section being spaced apart a less distance than the members of the rear section and extended therebetween, a rearwardly disposed cross frame member connecting the outer side frame members together and secured to the rear ends of the inner side frame members, a forwardly disposed cross frame member connecting the inner side frame members together at a locality between said outer side frame members, said forwardly disposed cross frame member having attaching extensions projecting outwardly from said inner side frame members and said outer side frame members having attaching extensions projecting inwardly from said outer side frame members, each of the extensions of the side frame members of one section comprising a longitudinally opening channel member having a transversely extending vertical wall terminating along the upper and lower edges thereof in spaced horizontal flanges directed longitudinally from said edges, the extensions of the other section having portions abutting said vertical walls and received between said flanges in interfitting relation upon relatively shifting said sections together in a longitudinal direction.

8. In a motor vehicle, a front main frame section and a rear main frame section, each section including spaced longitudinal side members, the members of the front section being spaced apart a less distance than the members of the rear section and extended therebetween, a rearwardly disposed cross frame member connecting the outer side frame members together and secured to the rear ends of the inner side frame members, a forwardly disposed cross frame member connecting the inner side frame members together at a locality between said outer side frame members, and pairs of transverse attaching extensions on said inner and outer side frame members projecting respectively outwardly and inwardly of said side frame members, the attaching extensions on the outer side frame members providing abutmentslying in the path of and engaged by the attaching extensions on the inner side frame members upon relatively shifting said sections together in a longitudinal direction to assemble the same, one pair of attaching extensions comprising channels opening in a longitudinal direction and receiving the other pair of attaching extensions, said inner side frame members being declined rearwardly to extend throughout the major portions thereof between said cross frame members below the rearwardly disposed cross frame member and secured to the underside of the latter.

9. In a motor vehicle, a front main frame section and a rear main frame section, each section including spaced longitudinal side members, the members of the front section being spaced apart a less distance than the members of the rear section and extended therebetween, a rearwardly disposed cross frame member connecting the outer side frame members together and secured to the rear ends of the inner side frame members, a forwardly disposed cross frame member connecting the inner side frame members together at a locality between said outer side frame members, said forwardly disposed cross frame member having attaching extensions projecting outwardly from said inner side frame members and said outer side frame members having attaching extensions projecting inwardly from said outer side frame members, the extensions of the side frame members of one section comprising channels opening longitudinally and the extensions of the other section having portions abutting and received within said channels in interfitting relation upon relatively shifting said sections together in a longitudinal direction, said inner side frame members being declined rearwardly to extend throughout the major portions thereof between said cross frame members below the rearwardly disposed cross frame member and secured to the underside of the latter.

10. In a motor vehicle, a front main frame section and a rear main frame section, each section including spaced longitudinal side members, the members of the front section being spaced apart a less distance than the members of the rear section and extended therebetween, a rearwardly disposed cross frame member connecting the outer side frame members together and secured to the rear ends of the inner side frame members, a forwardly disposed cross frame member connecting the inner side frame members together at a locality between said outer side frame members, and pairs of transverse attaching extensions on said inner and outer side frame members projecting respectively outwardly and inwardly of said side frame members, each of the extensions of the side frame members of one section comprising a longitudinally opening channel member having a transversely extending vertical wall terminating along the upper and lower edges thereof in spaced horizontal flanges directed longitudinally from said edges, the extensions of the other section having portions abutting said vertical walls and received between said flanges in interfiitting relation upon relatively shifting said sections together in a longitudinal direction.

MILLARD H. TONCRAY.
DANA K. BADERTSCHER.

References Cited in the file of this patent

UNITED STATES PATENTS

| Number | Name | Date |
|---|---|---|
| 1,565,624 | Chilton | Dec. 15, 1925 |
| 1,629,301 | Pfander | May 17, 1927 |
| 1,697,386 | Douglas et al. | Jan. 1, 1929 |
| 2,058,580 | Evans | Oct. 27, 1936 |
| 2,074,158 | Avery | Mar. 16, 1937 |
| 2,100,561 | Kliesrath | Nov. 30, 1937 |
| 2,108,215 | Stief et al. | Feb. 15, 1938 |
| 2,111,563 | Kliesrath | Mar. 22, 1938 |
| 2,139,750 | Hicks | Dec. 13, 1938 |
| 2,157,649 | Eksergian | May 9, 1939 |
| 2,248,319 | Waterhouse, Jr. | July 8, 1941 |